United States Patent [19]
Ito

[11] Patent Number: 6,053,567
[45] Date of Patent: Apr. 25, 2000

[54] CAR BODY REINFORCING BAR MEANS

[76] Inventor: Shigeru Ito, 1070-6, Ichigao-cho, Aoba-ku, Yokohama, Kanagawa, Japan

[21] Appl. No.: 08/991,638

[22] Filed: Dec. 16, 1997

[30] Foreign Application Priority Data

Feb. 6, 1997 [JP] Japan ................... 9-938446

[51] Int. Cl.⁷ .................................................. B62D 27/06
[52] U.S. Cl. ................. 296/203.01; 296/188; 296/205
[58] Field of Search ................ 296/40, 188, 203.01, 296/203.03, 204, 205

[56] References Cited

U.S. PATENT DOCUMENTS

| | | | |
|---|---|---|---|
| 789,854 | 5/1905 | Hammond et al. | 296/40 |
| 858,283 | 6/1907 | Heard et al. | 296/40 |
| 1,225,192 | 5/1917 | Traylor | 296/40 |
| 4,024,821 | 5/1977 | Yang | 296/40 |

*Primary Examiner*—Dennis H. Pedder
*Attorney, Agent, or Firm*—Armstrong, Westerman, Hattori, McLeland & Naughton

[57] ABSTRACT

A car body reinforcing bar means (2) comprising bar members (9) and (10) connected by a turn buckle (16) at one ends and provided with fixing portions (6) and (7) at the other ends thereof to a car body (1), length of the reinforcing bar means (2) being about the same as inside width of the car body (1).

1 Claim, 4 Drawing Sheets

CAR BODY REINFORCING BAR MEANS

BACKGROUND OF THE INVENTION

1. Field of the Invention

This invention relates to a car body reinforcing bar means fixed to a car body in a crossing situation with a strut bar so as to improve rigidity of the car body.

2. Prior Art

High rigidity of a car body is required for a car travel effectively at high speed. If rigidity of the car body is not sufficient, torsion of the body would be occurred due to force transmitted from a road surface or driving wheels during traveling or force generated upon cornering. This would result in imperfect suspension strokes.

Although rigidity of a suspension fixing portion has been conventionally reinforced by means of front or rear strut bars, reinforcement of rigidity by such strut bars is not always effective and thus a further improvement thereof has been required.

SUMMARY OF THE INVENTION

Accordingly, it is an object of the present invention is to provide a car body reinforcing bar means comprising bar means connected by a turn buckle at one ends and provided with fixing portions at the other ends thereof, length of the reinforcing bar means being about the same as inside width of the body. Two or more of the turn buckles may also be used.

DETAILED DESCRIPTION OF THE PREFERRED EMBODIMENTS

Figure 1:
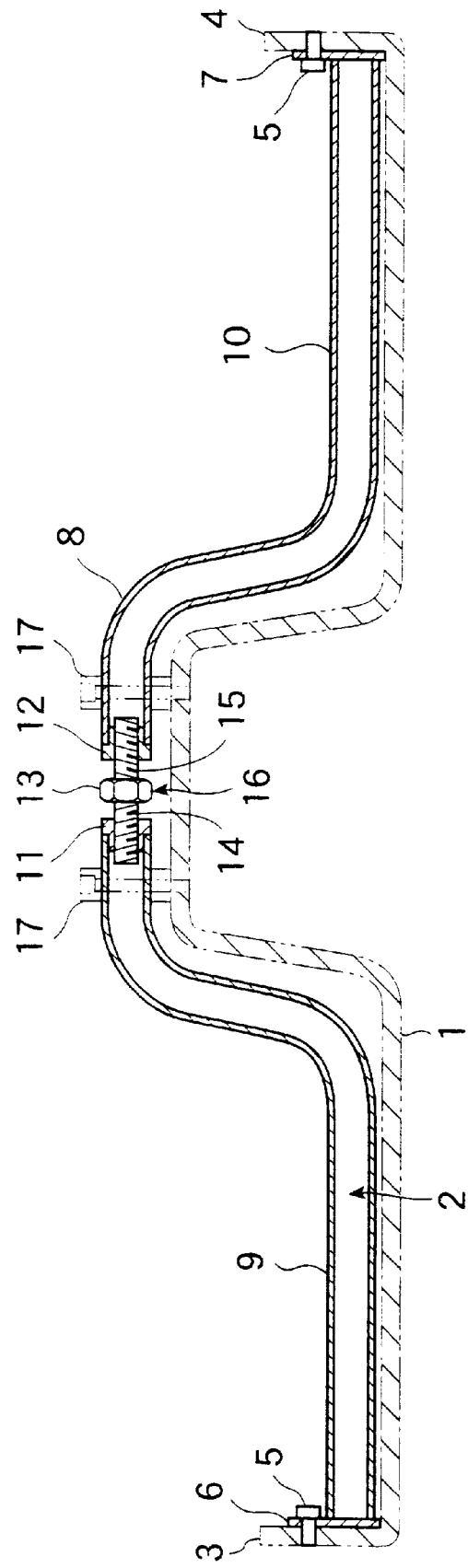
FIG. 1 is a partially elevational view in section of a car body reinforcing means according to the present invention.

Bar members used in the present invention are not necessarily straight but may be formed to fit with a floor surface of a car body.

A reinforcing means of the present invention is fixed through fixing portions of both ends thereof to the car body and desirably further fastened by means of adequate fixing members to the floor surface at appropriate intervals.

As the car body reinforcing means is fixed to the car body in a crossing situation with a strut bar (not shown), force transmitted from a road surface and driving wheels during running or force generated upon cornering can be absorbed by the reinforcing means to control undesirable torsion of the car body, thereby maintaining suspension strokes more exactly. Rigidity of the car body is thus improved sufficiently to run a car at high speed effectively.

Referring now to the drawings, the present invention will be further detailed in the following.

Figure 2:
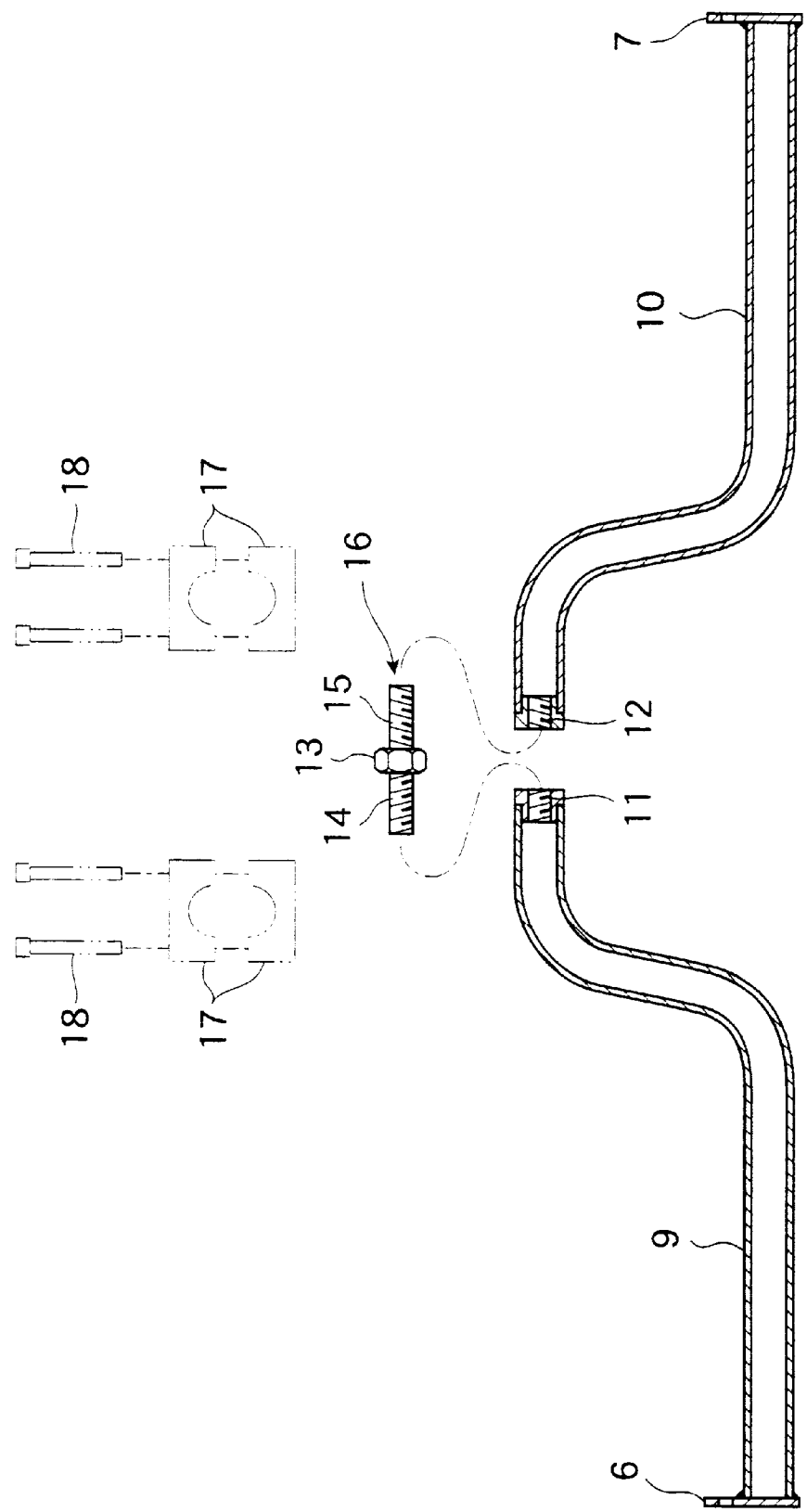
FIG. 2 is a partially elevational exploded view in section of a car body reinforcing means shown in FIG. 1.
Figure 3:
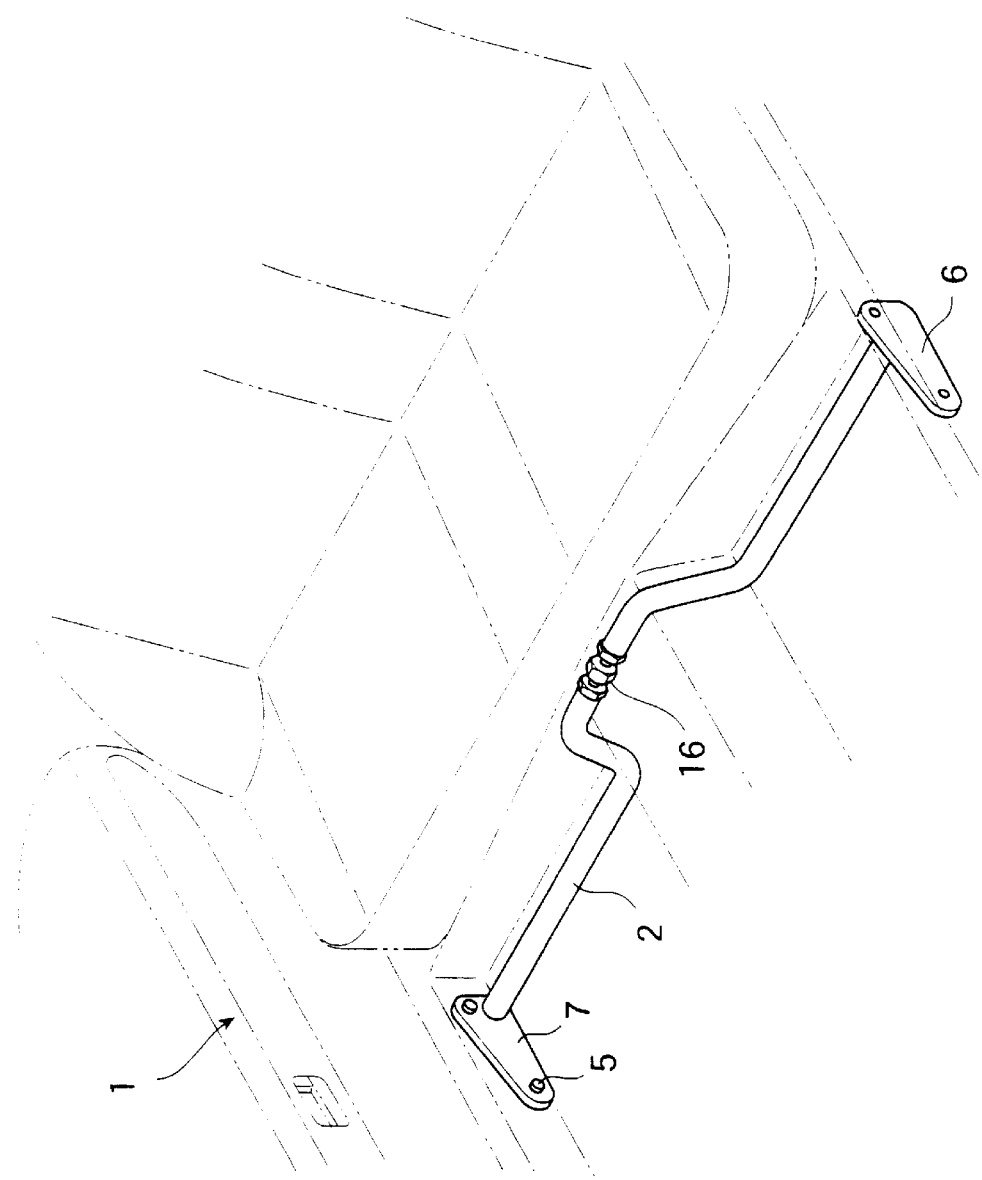
FIG. 3 is a view showing that a car body reinforcing means of FIG. 1 is practically used.

FIGS. 1 to 3 show a first embosiment of the car body reinforcing bar means of the present invention. In the figures, numerals 1 and 2 designate a car body and a reinforcing bar means, respectively. The reinforcing bar means 2 is made of a metal pipe, which length is about the same as inside width of the car body and has a convex portion 8 in the middle thereof. The reinforcing bar means 2 is provided with fixing portions 6 and 7 at both ends to fix thereof on respective inner surfaces of side walls 3 and 4 of the car body I at a lower position by means of screws 5.

The reinforcing bar means 2 comprises right and left bar members 9 and 10, which are separated each other at the middle convex portion 8, and turn buckle receiving nuts 11 and 12 securely fixed in both inner ends of the bar members 9 and 10.

The reinforcing bar means 2 further comprises an integral turn buckle bolt 16 composed of a hexagonal head portion 13 and right and left thread portions 14 and 15 extended therefrom, which are screwed into the turn buckle nuts 11 and 12 to connect the right and left bar members 9 and 10.

A space between the right and left fixing portions 6 and 7, i.e. length of the reinforcing bar means 2, can be controlled by revolving the hexagonal head portions 13 clockwise or counterclockwise.

The reinforcing bar means is additionally fastened to a floor of the car body 1 by means of a pair of pipe fasteners 17.

Figure 4:
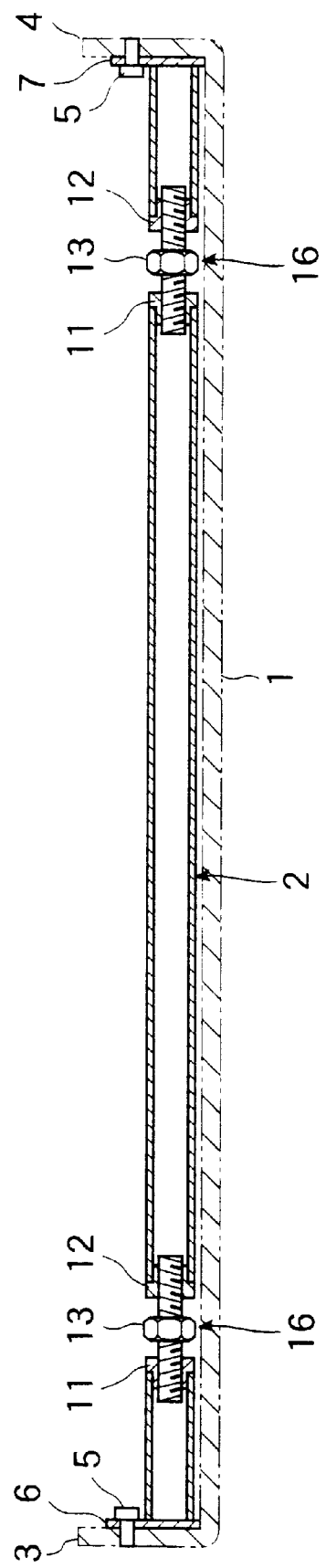
FIG. 4 is a partially elevational view in section of a car body reinforcing means according to another embodiment of the present invention.

FIG. 4 shows a second embodiment of the reinforcing bar means in which the bar members are connected by two turn buckles and which is straight.

What is claimed is:

1. A reinforcing bar assembly for a car body comprising:

a pair of bar members forming a central concavity curved to conform to a convexly shaped car body portion, each of said bar members having a threaded end portion and a fixing end portion to be fixed to said car body;

a threaded connecting member connecting said bar members to each other at said threaded end portions, said threaded connecting member having threads at both ends so that said bar members are either simultaneously drawn to or pushed away from each other by rotation of said threaded connecting member;

whereby the length of the reinforcing bar assembly is adjustable to an inside width of the car body.

* * * * *